Nov. 12, 1940.    N. N. OKUN    2,221,315
FLOOR TREATING MACHINE
Filed March 27, 1937    2 Sheets-Sheet 1

INVENTOR
Nathaniel N. Okun
BY
James & Franklin
ATTORNEYS

Nov. 12, 1940.    N. N. OKUN    2,221,315
FLOOR TREATING MACHINE
Filed March 27, 1937    2 Sheets-Sheet 2
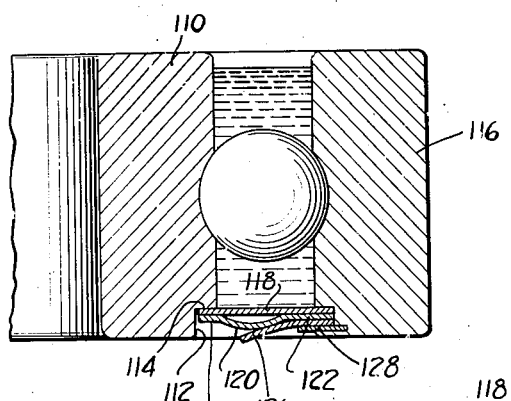
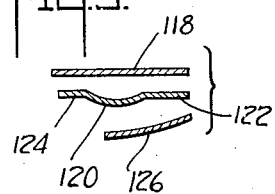
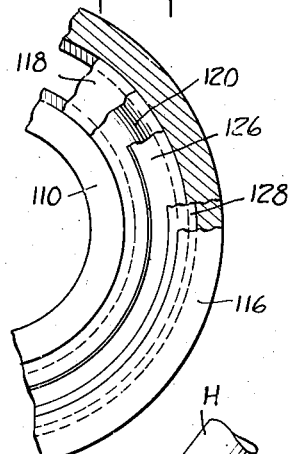
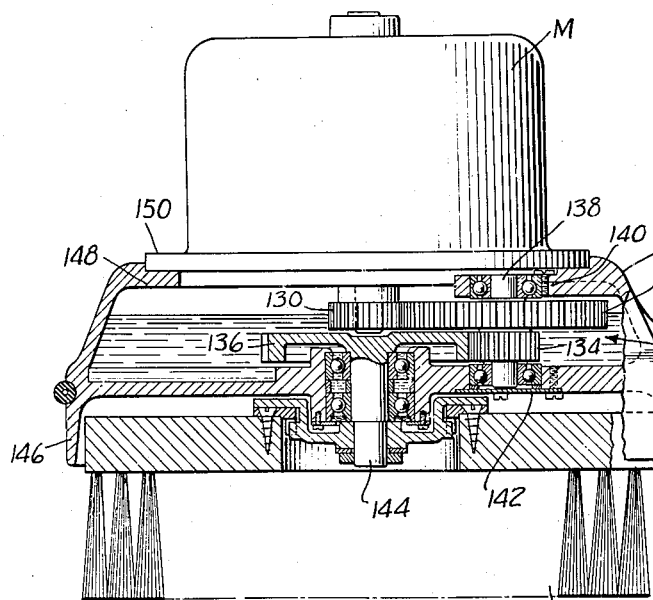
INVENTOR
*Nathaniel N. Okun*
BY
*James & Franklin*
ATTORNEYS Patented Nov. 12, 1940

2,221,315

UNITED STATES PATENT OFFICE

2,221,315

FLOOR TREATING MACHINE

Nathaniel N. Okun, Bronx, N. Y., assignor to Atlas Floor Surfacing Machinery Corporation, New York, N. Y., a corporation of New York Application March 27, 1937, Serial No. 133,297

2 Claims. (Cl. 74—421)

This invention relates to floor treating machines.

The primary object of my invention is to generally improve floor treating machines, especially floor polishing machines of the disc brush type. More particular objects are to simplify the manufacture of the machine and to at the same time greatly increase the wear obtainable therefrom.

The increased wear is produced mainly by providing well-spaced accurately aligned bearings which minimize wobbling of the reduction gear shafts, and by maintaining excellent lubrication by housing the reduction gearing in an enclosed gear case filled with a free-flowing grease or heavy oil.

It is extremely important when dealing with floor treating machines to prevent any possibility of drippage of grease or oil onto the floor or surface being treated. For this reason, some inventors working on the problem have been forced to use an exceedingly heavy grease, but this is undesirable because such grease is thrown outwardly by centrifugal force during operation of the machine, and the bearings are left dry and inadequately lubricated. Others have completely changed the structural characteristics of the machine and employ an inverted rotatable case to which the brush is directly attached, thereby eliminating the usual bottom bearing passing through a stationary gear case. This, however, results in a complex structure and introduces several disadvantages. In accordance with one feature of my invention, much of the simplicity of prior arrangements is retained, but the lowermost bearing is equipped with an improved mechanical oil seal which is not subject to rapid wear and leakage such as occur with oil seals made of felt or the like.

In this connection, I may point out that it is important to minimize the height of the machine so that it will run stably while resting solely on the brush, for with a high center of gravity the machine will wobble from side to side in an annoying manner. It is also desirable to keep the machine low so that it may run beneath furniture and the like. The seal which I employ in my improved floor treating machine requires no greater axial distance than a regular "FL" or standard felt seal bearing, and is to be contrasted with any special forms of seal which require several inches more of shaft space and which would therefore increase the height of the machine by at least that amount.

The gear reduction arrangement of the present machine is preferably made of a simple type which has already proved its worth in practice. The motor is mounted with its shaft vertical and preferably concentric with the gear casing. The brush holder shaft is also made concentric with the gear casing and coaxial with the motor. The lower end of the motor shaft is provided with a driving pinion, while the upper end of the tool holder shaft is provided with a driven gear. A counter-shaft, offset from the center of the gear casing, carries a pinion meshing with the aforesaid gear and a gear meshing with the motor pinion. The counter-shaft is comparatively short, and in many cases has heretofore been supported by bearings disposed between the gear and pinion mounted thereon. With this arrangement, however, the bearings are close together and the shaft is subject to a slight wobble which increases the wear of the entire reduction gear train. To space the bearings widely apart at the uppermost and lowermost ends of the counter-shaft has heretofore been difficult and has necessitated a number of separate machine operations, mainly because of the necessity of obtaining a perfect vertical alignment of the bearing seats. The top bearing seat has been made on a separate arm, but even this requires perfect adjustment and alignment when locating the mounting screws for the bearing arm. In accordance with a feature and object of the present invention, the bearing arm at the top of the gear casing is made integral with the gear casing, and the bearing seats for both the top and bottom bearings are made cylindrical and preferably equal in diameter, and are thereby so related that both may be bored in a single machine operation. In this way the bearings are kept in perfect alignment, and manufacturing expense is minimized.

To the accomplishment of the foregoing and such other objects as may hereinafter appear, my invention consists in the floor machine elements and their relation one to the other, as hereinafter are more particularly described in the specification and sought to be defined in the claims. The specification is accompanied by drawings in which:

Fig. 3 is an enlarged radial section showing a detail of the oil seal;

Fig. 4 is a partially sectioned fragmentary inverted plan view of the oil seal;

Fig. 5 is explanatory of the oil seal; and

Fig. 6 is a partially sectioned elevation through a modified floor machine.

Figure 1:
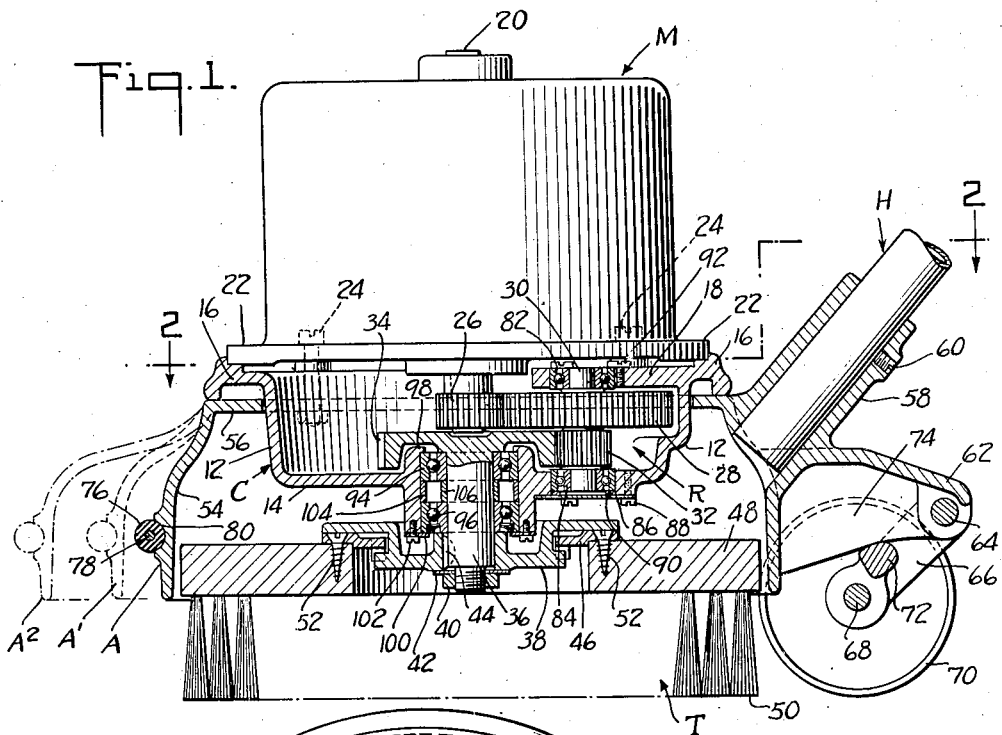
Fig. 1 is a partially sectioned side elevation of a floor treating machine embodying features of my invention.
Figure 2:
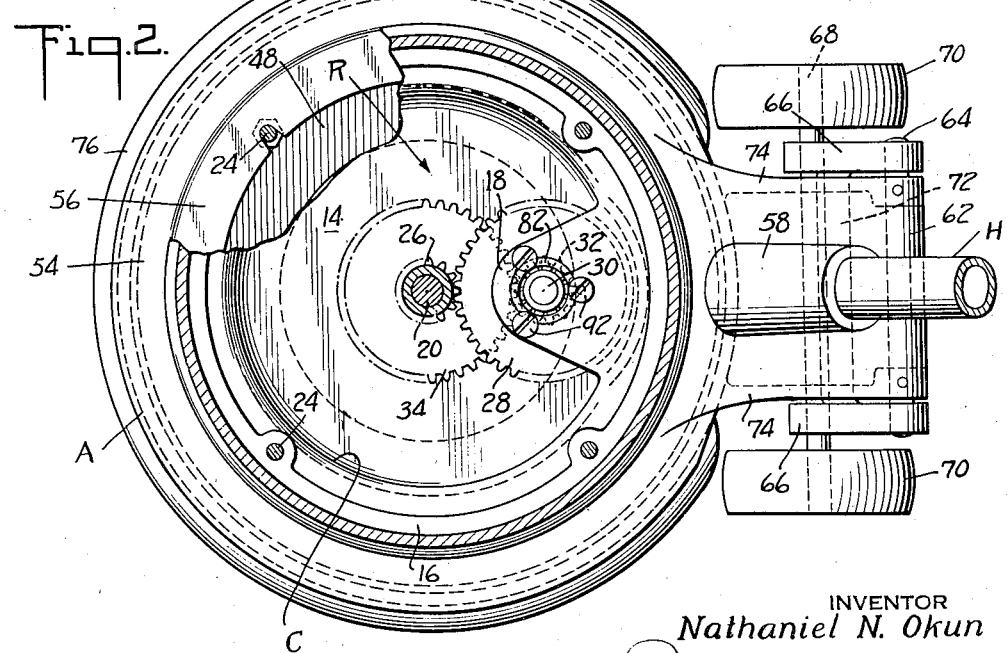
Fig. 2 is a horizontal section taken in the plane of the line 2—2 of Fig. 1.

Referring to the drawings and more particularly to Figs. 1 and 2, the floor machine comprises a motor M, a tool T, and reduction gearing R connecting the motor and tool. The reduction gearing preferably runs in a bath of oil or grease contained in an enclosed grease case C, while the tool T is protectively surrounded by an annular apron A. The tool is manipulated by an appropriate handle H, only the lower end of which is shown.

Considering the arrangement in greater detail, the gear housing or casing C has a side wall 12 and a bottom wall 14. The casing is outwardly flanged at 16 and has preferably integrally cast therewith an inwardly projecting bearing arm 18. The motor M is disposed with its shaft 20 vertically and preferably concentric with casing C. The motor is provided near its lower end with an outwardly projecting flange 22, and the latter is secured to flange 16 of the gear casing by means of bolts 24. The motor thus functions to seal the open top of the casing, and acts as a top wall therefor.

The reduction gear train R comprises a pinion 26 meshing with a gear 28 mounted on a countershaft 30. The counter-shaft also carries a pinion 32 which in turn meshes with a gear 34 at the upper end of tool holder shaft 36. The tool holder shaft passes through the bottom wall 14 of the gear casing and is preferably concentric with the casing and therefore coaxial with the motor shaft 20. Shaft 36 carries at its lower end a tool holder 38, the latter being held in place by means of a nut 40 turned against a washer 42 and being rotationally locked to shaft 36 by a key 44.

The tool T may be one of a variety of tools, such as a polishing brush, or scrubbing brush, or sandpaper wheel, or steel refinishing brush, etc. In the present case the tool is a polishing brush having a wood back 48 in which the bristles 50 are mounted. The tools are interchangeable and are readily applied to the tool holder 38 by means of a mating ring 46, the latter being permanently secured to the back 48 of the tool by means of screws 52. The detachable connection between ring 46 and tool holder 38 may be of conventional type and therefore requires no detailed description.

The apron A is a generally annular casting and comprises a side wall 54 and a top wall or inwardly directed flange 56. At one point the apron is provided with a socket 58 for receiving the handle H, the handle being locked in place by a set screw 60. The apron is also provided with an appropriate wheel-carrying bracket 62 through which passes a pin 64 on which wheel-carrying arms 66 are oscillatably mounted. The latter carry an axle 68 and support wheels 70. The wheels may be readily moved to either an upward or downward position, and in the drawings are shown in the downward position, the motion of support arms 66 being limited by a bar 72 which extends between and is preferably formed integrally with the support arms, the said bar 72 bearing upwardly against the side webs 74 of bracket 62. In the downward position shown, the tool T is readily lifted from the floor by tilting the handle H downwardly slightly about the wheels, and the machine may then be transported from one room to another on the wheels. During use, the arms 66 are turned outwardly and upwardly until they rest above rather than below the bracket, and at such time the machine rests directly and wholly on the tool T.

The apron is provided with a rubber or other resilient bumper 76, the said bumper having a metallic wire 78 running through the center thereof, which wire may be used to tension the bumper about the periphery of the apron, the bumper being seated in an appropriate mating groove 80.

One advantage of the present arrangement in which the apron is separate from and detachably related to the gear casing, resides in the fact that floor treating machines of different sizes may be made while using a single standardized motor and reduction gear arrangement. Thus, in Fig. 1 reference may be made to the aprons indicated in dotted lines at A' and A² showing how aprons of different diameter may be made, each with an inwardly directed flange 56 of the same dimension, so that the flange may be set beneath the outwardly projecting flange 16 of the gear case and secured thereto. The change in diameter has been indicated at only the left-hand side of the drawings, but it will be understood that this change applies to the entire circumference of the apron. This naturally follows from the fact that the larger apron is provided only where a larger-diameter tool is to be used, and the tool is, of course, circular.

The counter-shaft 30 runs in anti-friction bearings, there being a ball bearing 82 at the top end of the shaft and a ball bearing 84 at the bottom end of the shaft. Each of these bearings may be conventional in comprising an inner race which is forced over and rotates with the shaft, and an outer race which is forced into and remains stationary with the gear case. The counter-shaft is shouldered just below the upper bearing 82 and just above the lower bearing 84, and this prevents movement of the bearings toward one another. Downward movement of the lower bearing 84 is prevented by a closure plate 86 which is secured against the bottom wall of the gear case by a group of peripherally disposed screws 88. A spacer ring 90 may be put between the outer race of the bearing and the closure plate 86 in order to insure proper location of the bearing. The surface of the casing which receives the closure plate 86 is accurately finished so that the casing is closed with a leak-proof joint. Upward movement of the top bearing 82 is prevented by one or a group of screws 92 which are threadedly received in the bearing arm 18 and the heads of which are large enough in diameter to extend over at least a part of the outer race of the bearing. No closure plate is needed at the top bearing.

It should be particularly noted that the bearing seats are not only aligned but are preferably simple cylindrical seats of equal diameter. With this arrangement, both bearing seats may be bored or turned in a single maching operation, which greatly simplifies the maching of the gear case and reduces the manufacturing cost thereof, and, even more importantly, insures perfect accurate alignment.

The tool holder shaft 36 also rotates in anti-friction bearings, there being an upper bearing 94 and a lower bearing 96. Each of these bearings comprises inner and outer races, with appropriate rollers therebetween. The bearings are carried in a bearing wall which projects upwardly and downwardly from bottom wall 14 of the gear casing. The gear 34 is preferably hollowed or recessed on its lower face to receive the bearing wall, and is preferably formed integrally with the tool holder shaft 36. These expedients minimize the vertical dimension of the gear case, and so lower the motor and consequently the center of gravity of the machine. The bearings are prevented from upward movement by a shoulder 98 formed on the bearing wall of the gear casing, and are prevented from downward movement by a ring 100 secured to the casing by screws 102. The outer races of the bearings are spaced apart by a spacer ring 104, while the inner races are spaced apart by a spacer ring 106. In machining the gear case, the bearing seat is turned at one diameter from the bottom or outside of the case toward the inside as far as the shoulder 98, and this is a simple machining operation.

The bottom bearing 96 is provided with an oil seal to prevent escape of even a comparatively light and free-flowing lubricant from the gear case. The nature of this seal will be best understood from consideration of Figs. 3, 4, and 5 of the drawings. The inner or rotatable bearing race 110 is stepped or recessed at 112 to provide an inwardly set shoulder 114 which is ground to a perfect finish. The outer race 116 has fixedly secured thereto a relatively flexible sealing ring 118, the said ring being made of suitable material, preferably a synthetic resinous material such as Bakelite. The inner edge of ring 118 overlaps and bears against the shoulder 114 of the inner race 110. In order to press these members firmly together for an effective oil seal, I provide a resilient ring 120 the outer portion 122 of which is anchored to the race 116, and the inner portion 124 of which bears against the flexible sealing ring 118. By reference to Fig. 5, it will be seen that normally the inner part 124 of ring 120 is displaced upwardly relative to the outer part 122; hence when the inner part 124 is forced downwardly to the same level as the outer part 122 as in Fig. 3, the resilient ring 120 bears firmly against the inner edge of the flexible sealing ring 118.

To further insure the maintenance of the desired sealing pressure, I provide an additional resilient ring 126 the outer edge of which is secured to bearing race 116, and the inner edge of which bears against the downwardly convex center part of ring 120. The ring 126 normally assumes the downwardly convex shape shown in Fig. 5, but is clamped against the other rings in such manner as to give the same an upwardly convex shape, as shown in Fig. 5. The resulting deformation of the rings 120 and 126 provides an enduring sealing pressure between sealing ring 118 and shoulder 114. This seal effectively prevents leakage of lubricant, and the entrance of dirt or grindings upwardly into the bearing and gear case. The various rings are secured to the outer race 116 by a split snap ring 128 which is set into a mating groove in the bearing race. In operation, this bearing is eminently satisfactory because it accommodates any slight radial movement, by a sliding action of the sealing disc 118 relative to the shoulder 114, and it accommodates any slight axial movement, by the flexible nature of the sealing ring and the resilient rings bearing thereagainst.

A number of the features of the invention disclosed above may be employed even when the gear case and apron are formed integrally rather than separately. Such an arrangement is illustrated in Fig. 6, referring to which it will be seen that the motor M is mounted on a cast base B the upper part of which forms an enclosed gear case, and the lower part of which forms an apron for protecting the tool T. In this modification of the invention, the drive between the motor and the tool is through a reduction gear train exactly like that previously described, it comprising a pinion 130 meshing with a gear 132 which in turn is fixed to a pinion 134 meshing with the tool holder gear 136. The countershaft 138 is carried in top and bottom ball bearings, just as previously described, and these bearings are placed in aligned cylindrical seats which may be turned in a single machining operation. The base B is provided with an inwardly directed bearing arm 140 for the upper bearing seat, this arm being cast integrally with the remainder of the base. The enclosed gear space is adapted to be filled or partially filled with lubricant, as is indicated in the drawings, and the enclosed chamber is sealed against escape of lubricant beneath the countershaft by a closure plate 142, all as has previously been described. Similarly, the tool holder shaft 144 runs in upper and lower bearings the lower of which is preferably provided with a mechanical seal, just like that previously described in connection with Figs. 3 through 5 of the drawings. Also the gear 136 is recessed on its lower face to receive the upper end of the bearing wall of the tool holder shaft 144, and the latter is formed integrally with gear 136, so as to minimize the vertical dimension of the gear casing. The essential difference between the present arrangement and that previously described, resides in the fact that the downwardly directed apron flange 146 is formed integrally with the gear case, and the latter is provided with an inwardly rather than outwardly directed flange 148 on which the motor flange 150 is seated.

In both forms of the invention, it will be understood that the motor is provided with appropriate ventilation openings disposed above the motor flange, for the bottom of the motor casing is closed except for the bearing through which the motor shaft projects.

It is believed that the construction and operation of my improved floor treating machine, as well as the many advantages thereof, will be apparent from the foregoing detailed description. It will also be apparent that while I have shown and described the invention in preferred forms, many changes and modifications may be made in the structures disclosed, without departing from the spirit of the invention, defined in the following claims.

I claim:

1. Drive mechanism for driving a floor treating machine, said drive mechanism being compact in a vertical direction for stability, and comprising a large diameter open-topped shallow gear casing having a bottom wall and provided at the top with an inwardly projecting bearing arm, a motor mounted directly on said casing with its shaft vertical and concentric therewith, said motor being secured to and closing the top of the casing, a bearing wall projecting upwardly from the center of the bottom wall, a short tool holder shaft projecting upwardly through said bearing wall into the casing, a pinion at the lower end of the motor shaft, a gear at the upper end of the tool holder shaft, said gear being formed integrally with the shaft and being annularly recessed on its lower face to receive the upper end of the bearing wall in order to minimize the necessary vertical dimension of the casing, a counter-shaft carrying a gear meshing with said motor pinion and a pinion meshing with said tool holder gear, anti-friction bearings at the top and bottom ends of the counter-shaft, said bearings being received in seats formed directly in the aforesaid bearing arm and the bottom wall of the gear casing, anti-friction bearings in said bearing wall for said tool holder shaft, sealing means around said tool holder shaft for retaining lubricant thereabove, and a bottom closure plate secured in a leakproof manner to the bottom wall of the casing beneath the counter-shaft, whereby the gear casing may be filled with lubricant for the gears and bearings.

2. Drive mechanism for driving a floor treating machine, said drive mechanism being compact in a vertical direction for stability, and comprising a large-diameter open-topped shallow gear casing having a bottom wall and provided at the top with an inwardly projecting bearing arm cast integrally with said casing, a motor mounted directly on said casing with its shaft vertical and concentric therewith, said motor being secured to and closing the top of the casing, a bearing wall projecting upwardly from the center of the bottom wall, a short tool holder shaft projecting upwardly through said bearing wall into the casing coaxially with the motor, a pinion at the lower end of the motor shaft, a gear at the upper end of the tool holder shaft, said gear being formed integrally with the shaft and being annularly recessed on its lower face to receive the upper end of the bearing wall in order to minimize the necessary vertical dimension of the casing, a counter-shaft carrying a gear meshing with said motor pinion and a pinion meshing with said tool holder gear, anti-friction bearings at the top and bottom ends of the counter-shaft, said bearings being received in seats formed directly in the aforesaid bearing arm and the bottom wall of the gear casing, said bearing seats being aligned, cylindrical, and of equal diameter, anti-friction bearings in said bearing wall for said tool holder shaft, the lower of said bearings being provided with sealing means for retaining lubricant thereabove, and a bottom closure plate secured in a leakproof manner to the bottom wall of the casing beneath the counter-shaft, whereby the gear casing may be filled with lubricant for the gears and bearings.

NATHANIEL N. OKUN.